(12) United States Patent
Jersenius et al.

(10) Patent No.: US 11,160,093 B2
(45) Date of Patent: *Oct. 26, 2021

(54) METHODS AND SYSTEMS FOR SCHEDULING RESOURCES IN A TELECOMMUNICATION SYSTEM

(71) Applicant: Optis Cellular Technology, LLC, Plano, TX (US)

(72) Inventors: Kristina Jersenius, Linkoping (SE); Henning Wiemann, Aachen (DE); Anna Larmo, Espoo (FI); Peter Moberg, Stockholm (SE); Eva Englund, Linkoping (SE)

(73) Assignee: Optis Cellular Technology, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,911

(22) Filed: Jun. 23, 2020

(65) Prior Publication Data

US 2020/0322968 A1      Oct. 8, 2020

Related U.S. Application Data

(63) Continuation of application No. 16/122,016, filed on Sep. 5, 2018, now Pat. No. 10,721,745, which is a (Continued)

(30) Foreign Application Priority Data

Jun. 19, 2007   (SE) .................................... 0701516-7

(51) Int. Cl.
*H04W 72/10*       (2009.01)
*H04W 72/14*       (2009.01)
(Continued)

(52) U.S. Cl.
CPC ............. *H04W 72/10* (2013.01); *H04J 11/00* (2013.01); *H04L 47/10* (2013.01);
(Continued)

(58) Field of Classification Search
CPC ..... H04W 72/10; H04W 72/14; H04W 72/12; H04W 72/1284; H04W 72/1278;
(Continued)

(56) References Cited

U.S. PATENT DOCUMENTS 6,768,715 B2   7/2004  Hsu
7,000,174 B2   2/2006  Mantha et al.
(Continued)

FOREIGN PATENT DOCUMENTS

CN      1691820      11/2005
CN      1792066       6/2006
(Continued)

OTHER PUBLICATIONS

Nortel Networks, "Triggering of Scheduling Info when UE has grant available", R2-051972, 3GPP, Aug. 24, 2005, 3 pages.
(Continued)

*Primary Examiner* — Phong La
(74) *Attorney, Agent, or Firm* — Nixon & Vanderhye P.C.

(57) ABSTRACT

Scheduling requests are transmitted from a mobile terminal to a base station. The mobile sends a first scheduling request to the base station, the first scheduling request being associated with first data to be transmitted to the base station. The mobile receives a scheduling grant from the base station in response to the first scheduling request and transmits a buffer status report to the base station in response to receiving the scheduling grant. An HARQ acknowledgment for the buffer status report is received. Second data is received for transmission to the base station while at least some of the first data is waiting to be transmitted to the base station. A
(Continued)

change in a buffer status of the mobile terminal is detected indicating that the second data has higher priority than the first data. The mobile transmits a second subsequent scheduling request to the base station in response to the change in buffer status.

20 Claims, 10 Drawing Sheets

Related U.S. Application Data continuation of application No. 15/077,511, filed on Mar. 22, 2016, now Pat. No. 10,098,133, which is a continuation of application No. 13/874,809, filed on May 1, 2013, now Pat. No. 9,301,311, which is a continuation of application No. 12/664,962, filed as application No. PCT/SE2007/051044 on Dec. 19, 2007, now Pat. No. 8,437,293.

(51) Int. Cl.
  H04W 72/12    (2009.01)
  H04J 11/00    (2006.01)
  H04W 28/02    (2009.01)
  H04L 12/801   (2013.01)
  H04W 88/02    (2009.01)
  H04W 88/08    (2009.01)
  H04L 12/865   (2013.01)

(52) U.S. Cl.
  CPC ... *H04W 28/0278* (2013.01); *H04W 72/1278* (2013.01); *H04W 72/1284* (2013.01); *H04W 72/14* (2013.01); H04L 47/6275 (2013.01); H04W 72/1242 (2013.01); H04W 88/02 (2013.01); H04W 88/08 (2013.01)

(58) Field of Classification Search
  CPC ............. H04W 88/02; H04W 72/1242; H04W 28/0278; H04W 88/08; H04J 11/00; H04L 47/10; H04L 47/6275
  See application file for complete search history.

(56) References Cited

U.S. PATENT DOCUMENTS

| | | | |
|---|---|---|---|
| 7,142,548 B2 | 11/2006 | Fong et al. | |
| 7,145,889 B1 | 12/2006 | Zhang et al. | |
| 8,116,778 B2 | 2/2012 | Lee | |
| 8,437,293 B2 | 5/2013 | Jersenius | |
| 8,477,695 B2 | 7/2013 | Zhang | |
| 8,576,784 B2 | 11/2013 | Lohr et al. | |
| 8,619,747 B2 | 12/2013 | Terry et al. | |
| 8,995,996 B2 | 3/2015 | Bims | |
| 9,301,311 B2 | 3/2016 | Jersenius | |
| 10,098,133 B2 | 10/2018 | Jersenius | |
| 2002/0137521 A1 | 9/2002 | Kim et al. | |
| 2003/0214906 A1* | 11/2003 | Hu | H04L 47/35 370/231 |
| 2004/0004954 A1 | 1/2004 | Terry et al. | |
| 2005/0003843 A1 | 1/2005 | Ho et al. | |
| 2005/0030894 A1 | 2/2005 | Stephens | |
| 2005/0047416 A1* | 3/2005 | Heo | H04W 8/24 370/395.4 |
| 2005/0083943 A1 | 4/2005 | Lee et al. | |
| 2005/0105553 A1 | 5/2005 | Zhang et al. | |
| 2005/0135416 A1 | 6/2005 | Ketchum et al. | |
| 2005/0213534 A1 | 9/2005 | Benveniste | |
| 2005/0249138 A1 | 11/2005 | Heo et al. | |
| 2005/0249497 A1 | 11/2005 | Haran et al. | |
| 2006/0018277 A1 | 1/2006 | Petrovic | |
| 2006/0041667 A1 | 2/2006 | Ahn | |
| 2006/0077947 A1 | 4/2006 | Kim et al. | |
| 2006/0092876 A1 | 5/2006 | Kwak et al. | |
| 2006/0104240 A1 | 5/2006 | Sebire et al. | |
| 2006/0159098 A1 | 7/2006 | Munson et al. | |
| 2006/0190610 A1* | 8/2006 | Motegi | H04L 1/1877 709/228 |
| 2006/0215612 A1 | 9/2006 | Chemiakina et al. | |
| 2006/0248276 A1 | 11/2006 | Kilian et al. | |
| 2006/0280145 A1 | 12/2006 | Revel et al. | |
| 2006/0285515 A1 | 12/2006 | Julian et al. | |
| 2007/0047451 A1 | 3/2007 | Lohr et al. | |
| 2007/0047452 A1 | 3/2007 | Lohr et al. | |
| 2007/0082675 A1 | 4/2007 | Gruet | |
| 2007/0115894 A1 | 5/2007 | Herrmann et al. | |
| 2007/0124542 A1 | 5/2007 | Lohr et al. | |
| 2007/0189205 A1 | 8/2007 | Terry et al. | |
| 2007/0201397 A1 | 8/2007 | Zhang | |
| 2008/0004058 A1 | 1/2008 | Jeong et al. | |
| 2008/0080281 A1 | 4/2008 | Seo | |
| 2008/0080381 A1 | 4/2008 | Maheshwari et al. | |
| 2008/0081628 A1 | 4/2008 | Ye et al. | |
| 2008/0225693 A1 | 9/2008 | Zhang et al. | |
| 2008/0304447 A1* | 12/2008 | Kim | H04L 1/1877 370/329 |
| 2011/0255492 A1 | 10/2011 | Dai et al. | |

FOREIGN PATENT DOCUMENTS

| | | |
|---|---|---|
| EP | 1257139 | 11/2002 |
| EP | 1478136 | 11/2004 |
| EP | 1507352 | 2/2005 |
| EP | 1509012 | 2/2005 |
| EP | 1511245 | 3/2005 |
| EP | 1708523 | 10/2006 |
| EP | 1871057 | 12/2007 |
| EP | 1608194 | 1/2008 |
| JP | H08-265836 | 10/1996 |
| JP | 2005-006293 | 1/2005 |
| JP | 2006295725 | 10/2006 |
| WO | 2005099161 | 10/2005 |
| WO | 2006037492 | 4/2006 |
| WO | 2006051366 | 5/2006 |
| WO | 2006052208 | 5/2006 |
| WO | 2006077141 | 7/2006 |
| WO | 2007003707 | 1/2007 |
| WO | 2007089797 | 8/2007 |
| WO | PCT/EP2006-010521 | 8/2007 |
| WO | 2007148927 | 12/2007 |
| WO | 2008004914 | 1/2008 |
| WO | 2008136612 | 11/2008 |

OTHER PUBLICATIONS

International Search Report issued in PCT/SE2007/051044 dated Sep. 23, 2008, 4 pages.
Ericsson, "HS-POSCH Serving Cell Change Enhancements", R1-080911, 3GPP TSG RAN WG1 Meeting #52, Sorrento, Italy, Feb. 11-15, 2008, 3 pages.
Qualcomm, "Improving Reliability of HS-POSCH Serving Cell Change Procedure", R1-080815, 3GPP, Feb. 11-15, 2008, 8 pages.
Qualcomm, "SI Transmission Triggering Schemes", R2-051445, 3GPP, May 5, 2005, 4 pages.
Qualcomm, "SI Transmission Triggering Schemes", R2-050956, 3GPP, Mar. 30, 2005, 7 pages.
Nortel Networks, Indication of Scheduling Request in Advance, R2-051034, 3GPP TSG-RAN2#46bis, dated Apr. 8, 2005, 2 pages.
Nokia, Buffer Reporting for E-UTRAN, R2-060829, 3GPP TSG-RAN WG2 Meeting #52, dated Mar. 31, 2006, 5 pages.
Ericsson, Schedule Request in E-UTRAN, R2-063215, 3GPP TSG WG #56, dated Nov. 10, 2006, 11 pages.
Russian Decision of Grant for Application No. 2012100764. dated Nov. 24, 2015, 9 pages.
Singapore Written Opinion for Application No. 200908014-4, dated Dec. 20, 2010, 9 pages.
Australian Office Action dated Jul. 4, 2012 in corresponding AU Application No. 2007355223, 3 pages.

(56) References Cited

OTHER PUBLICATIONS

Japanese Office Action dated Nov. 7, 2011 in corresponding JP Application No. 2010-513154.
Mexican Office Action dated Nov. 25, 2010 in corresponding MX Application No. MX/a/2009/013430, 2 pages.
Qualcomm. SI Transmission Triggering Schemes. 3GPP TSG-RAN WG2 meeting #48. R2-051963. Aug. 23, 2005. 4 pages.
Catt. Enhancement to Buffer Status Reporting. 3GPP TSG-RAN WG2#57bis. R2-071345. Mar. 21, 2007. 5 pages.
3GPP. 3rd Generation Partnership Project; Technical Specification Group Radio Access Network; Medium Access Control (MAC) protocol specification (Release 7). 3GPP TS 25.321 v7.4.0. Mar. 28, 2007.
3GPP. 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8). 3GPP TS 36.300 v8.0.0. Mar. 2007.
3GPP. 3rd Generation Partnership Project; Technical Specification Group Radio Access Network; FDD Enhanced Uplink; Overall description; Stage 2 (Release 6). 3GPP TS 25.309 v6.6.0. Mar. 2006.
IP Wireless. Concerns on issues regarding QoS and UL Scheduling. 3GPP R2-062279 Sep. 1, 2006. 6 pages.
TD Tech. Discussion on Uplin Scheduling Request. 3GPP R2-071971. May 11, 2007.
Defendants Blackberry Limited's, Blackberry Corporation's, Kyocera Corporation's and Kyocera International, Inc.'s Invalidity Contentions, file in the U.S. District Court for the Eastern District of Texas, Marshall Division on Aug. 1, 2016. 69 Pages.
European Search Report dated Aug. 25, 2016 in corresponding EP Application No. 07861139.9, 6 pages.
3GPP TSG RAM WG1 LTE Ad Hoc, R1-061776, Uplink Resource Request for Uplink Scheduling, Cannes, France, Jun. 27-30, 2006 ("R1-061776"). 3 pages.
3GPP TSG RAN WG2 Meeting #54, R2-062164, Uplink Resource Allocation Scheme, Tallin Estonia, Aug. 28-Sep. 1, 2006 ("R2-062164"). 5 pages.
3GPP TSG RAN WG2 Meeting #48, R2-052076, 3GPP TS 25.309 V6.5.0 (Jun. 2005) ("R2-052076"). 32 pages.
3rd Generation Partnership Project; Technical Specification Group Radio Access Network; Medium Access Control (MAC) protocol specification (Release 6). 3GPP TS 25.321 V6.12.0 (Mar. 2007). 92 pages.
Office Action Comm Art 94(3) dated Dec. 11, 2017 in corresponding EP Application No. 07861139.9. 4pgs.
Declaration of Harry Bims. Mar. 21, 2018. 109 pages.
Claim Construction Memorandum Opinion and Order, *Optis Wireless Tech., LLC, et al.* v. *Huawei Techs. Co. Ltd., et al.*, No. 2:17-cv-123-JRG-RSP (E.D. Tex.) (Dkt. No. 114) (Jan. 18, 2018) 74 pages.
Claim Construction Memorandum Opinion and Order, *Optis Cellular Tech., LLC et al.* v. *Kyocera Corp., et al.*, No. 2:16-cv-0059-JRG-RSP (E.D. Tex) (Dkt. No. 108) (Feb. 8, 2017) 63 pages.
Declaration of Elean Fan. Mar. 19, 2018. 25 pages.
Declaration of Harry Bims, Ph.D. Re Claim Construction of U.S. Pat. Nos. 6604216, 8385284, and 8437293. Nov. 3, 2017. 111 pages.
3GPP TR 21.905 Technical Specification Group Services and System Aspects: Vocabulary for 3GPP Specifications, V7.1.0 (Mar. 2006) 55 pages.

Internet Archive's record of "www.3gpp.org-/ftp/Specs/archive25_series/25.309/" on Jun. 28, 2008. 1 page.
3GPP FTP Archive TS 25.309, www.3gpp.org-ftp/specs/archive/25_series/25.309/ (last visited Mar. 19, 2018) 1 page.
Curriculum Vitae of Harry Bims, Ph.D. Sep. 11, 2017. 28 pages.
3GPP FTP Archive TSGR2_52 Documents, www/3gpp.org-/ftp/tsg_ran/wg2_rl2/TSGR2_52/Documents/ (last visited Mar. 19, 2018) 4 pages.
Benoist Sebire's email message to RAN WG2's e-mail reflector dated Mar. 22, 2006, as found on 3GPP's public e-mail website. 10 pages.
3GPP FTP Archive TSGR2_54 Documents, www.3gpp.org-/ftp/tsg_ran/wg2_rl2/TSGR2_54/Documents/ (last visited Mar. 19, 2018) 10 pages.
Anil Umesh's e-mail message to RAN WG2's e-mail reflector dated Aug. 23, 2006, as found on 3GPP's public email website. 10 pages.
3GPP FTP Archive TSGR2_46bis Documents, www.3gpp.org-/ftp/tsg_ran/wg2_rl2/TSGR2_46bis/Documents/ (last visited Mar. 19, 2018) 7 pages.
Hector Vayanos's e-mail message to RAN WG2's e-mail reflector dated Mar. 29, 2015, as found on 3GPP's public email website. 10 pages.
Internet Archive's record of "http://www.3gpp.org/ftp/" webpage as of Apr. 14, 2006. 1 page.
Internet Archive's record of "http://www.3gpp.org/ftp/Specs/" on Apr. 26, 2006. 2 pages.
Internet Archive's record of "http://www.3gpp.org/ftp/Specs/latest" on Apr. 10, 2006. 1 page.
Internet Archive's record of "http://www.3gpp.org/ftp/Specs/latest/Rel-6" on May 2, 2006. 1 page.
Internet Archive's record of "http://www.3gpp.org/ftp/Specs/latest/Rel-6/25_series" on May 10, 2006. 2 pages.
Internet Archive's record of "http://www.3gpp.org" webpage as of Apr. 25, 2006. 1 page.
Internet Archive's record of "http://www.3gpp.org/specs/specs.htm" webpage as of Apr. 25, 2006. 5 pages.
First Examination Report issued May 23, 2018 in corresponding IN App No. 105/KOLNP/2010. 8pgs.
Internet Archive's record of "http://www.3gpp.org/specs/numbering.htm" webpage as of Apr. 25, 2006. 2 pages.
Internet Archive's record of "http://www.3gpp.org/ftp/Specs/html-info/25-series.htm" webpage as of May 3, 2006. 6 pages.
Internet Archive's record of "http://www.3gpp.org/ftp/Specs/html-info/25309.htm" webpage as of Jun. 14, 2006. 2 pages.
Petition for Inter Partes Review of U.S. Pat. No. 8,437,293 Under 35 U.S.C. §§311-319 and 37 C.F.R. §42.100 et seq. Mar. 21, 2018. 79 pages.
Ntt Docomo Inc. Uplink Resource Allocation Scheme (Dynamic Scheduling). R2- 062912. Oct. 9-13, 2006. Seoul, Korea. 7 Pgs.
Zte. UL Scheduling Information Report for E-UTRAN. R2-070028. Jan. 15-19, 2007. Sorrento, IT. 4 Pgs.
LS on Transmission of UL Scheduling Request. R2-063022. Oct. 9-13, 2006. Seoul, Korea. 6 Pgs.
Zte Corporation, Catt. SI Transmission Control in LCR TDD Enhanced Uplink. R2-062176. Aug. 28-Sep. 1, 2006. 8 Pgs.
Extended European Search Report dated Feb. 11, 2019 in EP Application No. 18211754.9, 8 pages.
LG Electronics Inc., "Relative Buffer Status Reporting" R2-050379, 3GPP TSG-RAN WG2 Meeting #46, Scottsdale, USA, Feb. 14-18, 2005, 2 pages.

* cited by examiner

METHODS AND SYSTEMS FOR SCHEDULING RESOURCES IN A TELECOMMUNICATION SYSTEM

CROSS-REFERENCE TO RELATED APPLICATIONS

This application is a continuation of U.S. patent application Ser. No. 16/122,016 filed Sep. 5, 2018, which is a continuation of U.S. patent application Ser. No. 15/077,511 filed Mar. 22, 2016, now U.S. Pat. No. 10,098,133, which is a continuation of U.S. patent application Ser. No. 13/874,809 filed May 1, 2013, now U.S. Pat. No. 9,301,311, which is a continuation of U.S. patent application Ser. No. 12/664,962, having a 371 date of Dec. 16, 2009, now U.S. Pat. No. 8,437,293, which is a national stage application of international patent application no. PCT/SE2007/51044, filed on Dec. 19, 2007 (published as WO/2008/156402), which claims priority to SE 0701516-7, filed on Jun. 19, 2007. The above identified applications and publications are incorporated by reference herein.

TECHNICAL FIELD

The present invention relates generally to telecommunication systems. Embodiments of the present invention relate to the scheduling of resources in a telecommunication system.

BACKGROUND

Radio access technologies for cellular mobile networks are continuously being evolved to meet future demands for high data rates, improved coverage and improved capacity. Examples of recent evolutions of the wideband code-division multiple access (WCDMA) technology are the High-Speed Packet Access (HSPA) protocols. Currently, further evolutions of the third generation (3G) systems, 3G Long Term Evolution (LTE), including new access technologies and new architectures, are being developed within the 3rd Generation Partnership Project (3GPP) standardization body.

A main objective of LTE systems is to provide a flexible access technology that can be used in existing frequency allocations and in new frequency allocations. Also, LTE systems should enable the use of different duplex solutions. For example, both frequency division duplex (FDD) and time division duplex (TDD), where the uplink and downlink are separated in frequency and in time, respectively, should be supported to provide usage in both paired and unpaired spectrum.

An access technology based on Orthogonal Frequency Division Multiplexing (OFDM) for the downlink and Single Carrier Frequency Division Multiple Access {SC-FDMA} for the uplink, for example, allows such flexible spectrum solutions.

Since the LTE concept is being designed to support fast scheduling in frequency and time both for the uplink and the downlink, the resource assignment in time and frequency should be preferably adjustable to the users' momentary traffic demand and channel variations. In the LTE uplink it is possible to schedule several users in one Time Transmission Interval {TTI} by assigning different frequency segments to different users. To maintain the single carrier structure, each user should only receive contiguous assignments in frequency as illustrated in FIG. 1.

Referring now to FIG. 2, a scheduler 202 in an evolved Node B {base station) 204 may perform resource assignment. Scheduling resources among two or more users in the uplink is complicated by the fact that the scheduler 202 is not automatically aware of the each user's uplink data and resource demand. That is, for example, the scheduler 202 may not be aware of how much data there is in the transmit buffers of each user's mobile terminal 206 {e.g., mobile phone, portable digital assistant, or any other mobile terminal). Mobile terminal 206 may also be referred to as user equipment {UE). In order to support fast scheduling, the scheduler 202 would have to be made aware of the UE's momentary traffic demands {e.g., the transmit buffer status).

The basic uplink scheduling concept is illustrated in FIG. 2. Typically, to inform the uplink {UL) scheduler 202 of the UE's momentary traffic demands, the system 200 supports {i) a dedicated scheduling request {SR) channel and {ii) buffer status reports. Alternatively, a synchronized random access channel {RACH) can be used for the same purpose.

The scheduler 202 monitors each UE's traffic demands and assigns resources accordingly. The scheduler 202 informs a UE {e.g., UE 206) of a scheduling decision by transmitting resource assignments 208 to the UE. In addition, there is a possibility to configure a UE to transmit channel sounding reference signals to enable the evolved Node B {eNodeB) to do broad band channel estimation for fast link adaptation and channel dependent scheduling.

A synchronized UE also has the opportunity to use, as a fallback solution, the Random Access Channel {RACH) to request a UL resource. In general, however, the RACH is intended mostly for non-synchronized UEs. In the dedicated SR channel approach, each active UE is assigned a dedicated channel for transmitting messages that indicate to the eNodeB that the UE requires a UL resource. Such a message is referred to as a scheduling request (SR) 210. The benefit with this method is that no UE identifier (ID) has to be transmitted, since the UE is identified by virtue of the "channel" it uses. Furthermore, in contrast to the contention based approach, no intra-cell collisions will occur.

In response to receiving an SR 210, the scheduler 202 may issue to the UE a scheduling grant (SG) 208. That is, the scheduler may select the resource(s) (e.g., time slot and/or frequency) the UE shall use and communicate this information to the UE. The scheduler 202 may also select, with support from the link adaptation function, a transport block size, a modulation scheme, coding scheme and an antenna scheme (i.e., the link adaptation is performed in the eNodeB and the selected transport format is signalled together with information on the user ID to the UE). The scheduling grant addresses a UE and not a specific radio bearer. In its simplest form, the scheduling grant is valid only for the next UL TTI. However, to reduce the amount of control signalling required, several proposals with alternative durations are possible.

After transmitting an initial SR, the UE may transmit a more detailed buffer status report to the scheduler 202. The buffer status report may be transmitted in-band (e.g., the buffer status report may be included as part of a medium access control (MAC) header). It is a common view in, for example, 3GPP that the buffer status report should contain more information than is contained in the initial SR.

The above described procedure is further illustrated in FIG. 3. As shown in FIG. 3, a UE 302 having data to transmit to an eNodeB 304 first transmits an SR 306 to the eNodeB 304, which SR 306 is then processed by an uplink scheduler 308 of eNodeB 304. In response to SR 306, uplink scheduler 308 transmits an SG (e.g., resource assignments) 310 to UE 302. Thereafter, UE 302 transmits data 312 to eNodeB together with a buffer status report 314, which report is processed by the uplink scheduler 308. As discussed above, buffer status report 314 may be transmitted in-band with data 312.

SUMMARY

It is an object to provide improved systems and methods for triggering uplink scheduling requests in a telecommunication system.

In one aspect, the invention provides a method for transmitting scheduling requests from a mobile terminal (or "UE") to a base station. In some embodiments, the method starts with the UE transmitting a first scheduling request (SR) to the base station in response to data becoming available for transmission to the base station. After transmitting the first SR, the UE receives a scheduling grant (SG) transmitted from the base station. In response to receiving the SG, the UE transmits to the base station transmit buffer status information. After transmitting the buffer status information to the base station, but prior to transmitting any subsequent SRs to the base station and while at least some of the data is waiting to be transmitted to the base station, the UE: (1) determines whether a scheduling request triggering event has occurred, and, if a triggering event has occurred, then the UE transmits a second SR to the base station at a next opportunity in response to determining that the triggering event has occurred; otherwise, if a triggering event has not occurred, then, the UE transmits to the base station at the next opportunity a message indicating that a triggering event has not occurred in response to determining that the triggering event has not occurred.

In some embodiments, the step of determining whether a scheduling request triggering event has occurred includes: (a) determining whether additional data that became available for transmission to the base station after the first SR was transmitted has a higher priority than the initial data; (b) determining whether the amount of time that has elapsed since the first SR was transmitted exceeds a threshold; and/or (c) determining whether the difference between the current amount of data in the transmit buffer and a previous, non-zero amount of data that was in the transmit buffer exceeds a threshold. In this or other embodiments, the step of determining whether a scheduling request triggering event has occurred includes: comparing the transmit buffer status information transmitted to the base station with new information concerning the status of the transmit buffer.

In some embodiments, the message indicating that a triggering event has not occurred is a one bit message and the SR is also a one bit message. Additionally, in some embodiments, the thresholds may be configured in the UE by the base station through radio resource control (RRC) signaling. Further, in some embodiments the UE is configured so that it transmits an SR at the next available opportunity every time that data arrives to an empty transmit buffer in the UE.

In another aspect, the invention relates to an improved mobile terminal. In some embodiments the improved mobile terminal includes a transmit buffer and a data processor. The data processor may be configured to cause the mobile terminal to transmit a first scheduling request (SR) to a base station in response to data arriving at an empty transmit buffer in the mobile terminal and cause the mobile terminal to transmit to the base station status information concerning the transmit buffer in response to receiving a scheduling grant (SG) from the base station. In some embodiments, the data processor may further be configured to determine whether a scheduling request triggering event has occurred; cause the mobile terminal transmit a second SR to the base station at a next opportunity in response to determining that a triggering event has occurred; and cause the mobile terminal to transmit to the base station, at a next opportunity, a message indicating that a triggering event has not occurred in response to determining that no triggering event has occurred. Preferably, these three steps are performed while at least some of the first data is waiting to be transmitted to the base station and after the UE transmits the buffer status information, but prior to the UE transmitting any subsequent SRs to the base station.

In some embodiments the improved mobile terminal includes: means for transmitting a first SR to a base station in response to an empty transmit buffer in the mobile terminal receiving data; means for receiving an SG transmitted from the base station; means for transmitting to the base station status information concerning the transmit buffer status in response to receiving the SG; triggering event detections means for determining whether a scheduling request triggering event has occurred; and means for transmitting to the base station, at a next opportunity, a second SR in response to determining that a scheduling request triggering event has occurred. In some embodiments, the triggering event detection means is configured to perform the determination while at least some of the data is waiting to be transmitted to the base station.

In another aspect, the invention relates to a method performed by a base station for granting uplink resources to mobile terminals. In some embodiments, the base station: allocates an uplink resource to a first mobile terminal, thereby enabling the first mobile terminal to transmit data to the base station; receives an SR from a second mobile terminal while the first mobile terminal is utilizing the uplink resource; reallocates the uplink resource to the second mobile terminal in response to receiving the SR; receives from the second mobile terminal information related to the priority of the data in the second mobile station that is waiting to be transmitted to the base station; compares the priority of the first mobile terminal's data to the priority of the second mobile terminal's data using respective priority information; reallocates the uplink resource to the first mobile terminal in response to determining that the first mobile terminal has higher priority data than the second mobile terminal; receives a subsequent SR from the second mobile terminal, where the subsequent SR is received after receiving the priority information from the second mobile terminal but before receiving any other priority information from the second mobile terminal; and reallocates the uplink resource to the second mobile terminal in response to receiving the subsequent SR.

In another aspect, the invention relates to an improved base station. In some embodiments, the improved base station includes means for communicating with a plurality of mobile terminals; means for allocating an uplink resource to one of the mobile terminals based on respective buffer status data transmissions from the terminals; means for reallocating the uplink resources to another one of the plurality of terminals based on receipt of a single bit message indicating a change of buffer status data of the other terminal.

In yet another aspect, the invention relates to a telecommunication system comprising an improved mobile terminal and improved base station.

The above and other aspects and embodiments of the present invention are described below with reference to the accompanying drawings.

BRIEF DESCRIPTION OF THE DRAWINGS

The accompanying drawings, which are incorporated herein and form part of the specification, illustrate various embodiments of the present invention.

DESCRIPTION OF EXAMPLE EMBODIMENTS

One possible scheduling request scheme is to define an SR as being a single bit message where the single bit (i.e., the "signal request bit") has been set to a particular predefined value (e.g., set to "1") and to configure the UEs such that the UEs transmit an SR to the scheduler whenever: (1) the UE has data to transmit (e.g., the UE has data in a transmit buffer) and (2) the UE does not have an uplink resource allocation for transmitting the data to the eNodeB. However, a potential drawback of this approach is illustrated by the example scheduling message flow shown in FIG. 4.

Figure 1:
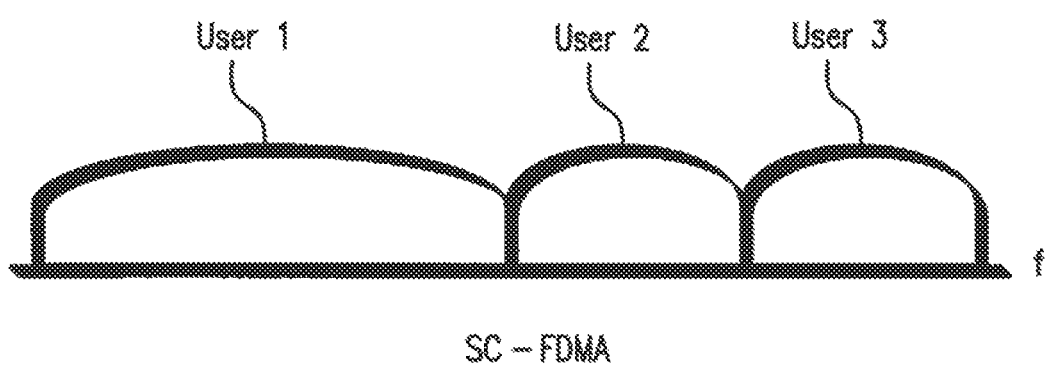
FIG. 1 schematically illustrates resource allocation to different users in an SC-FDMA system.
Figure 2:
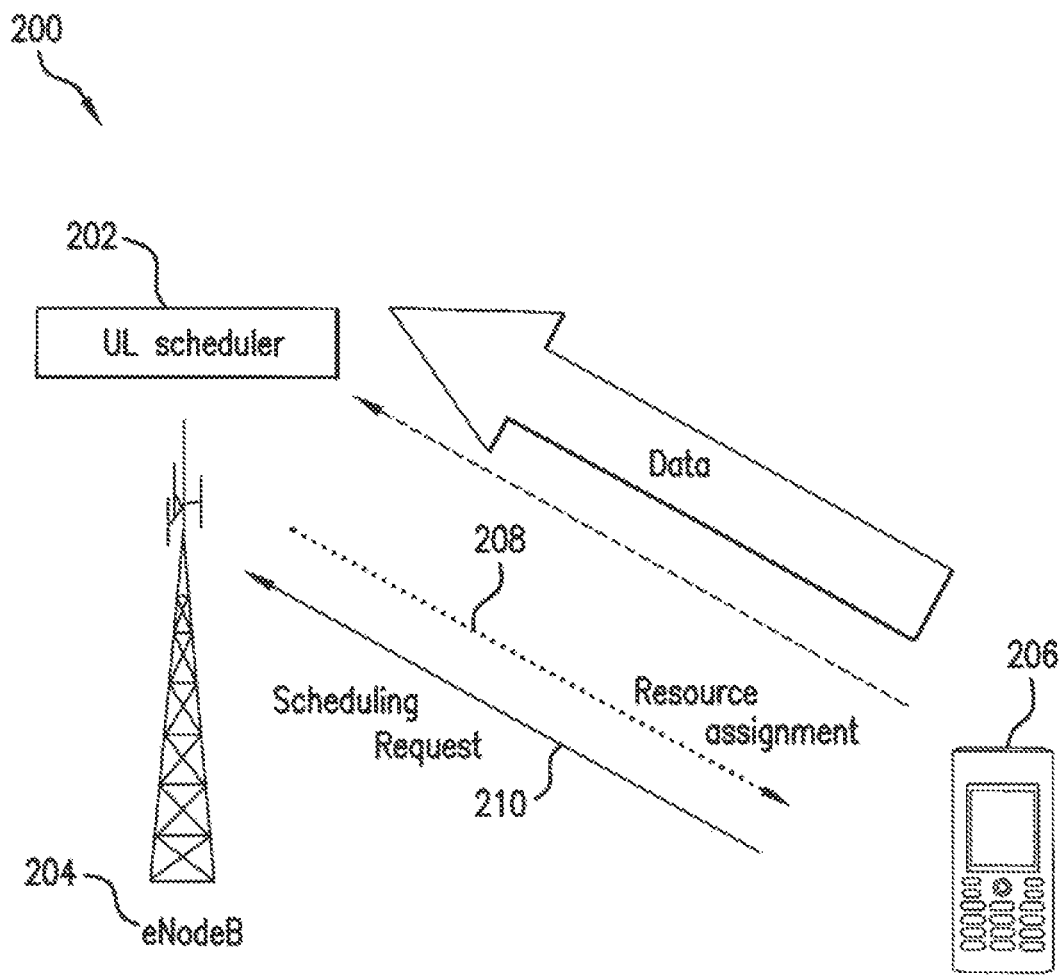
FIG. 2 illustrates uplink scheduling in an LTE system.
Figure 3:
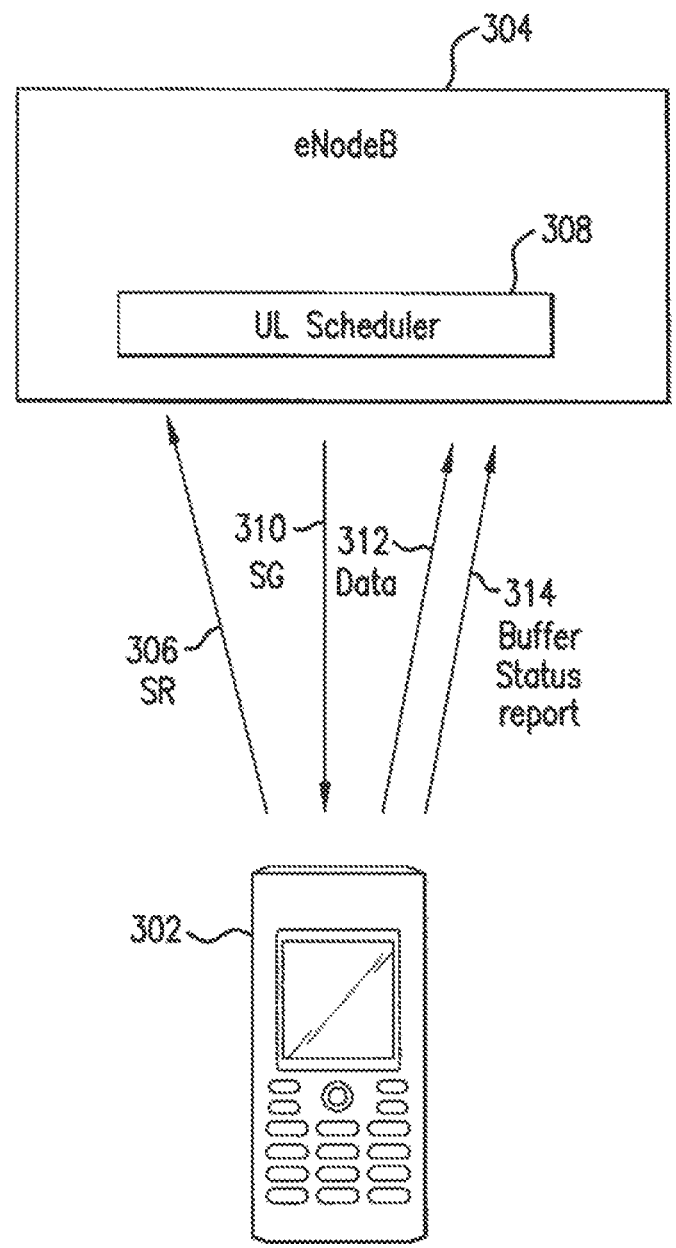
FIG. 3 illustrates a scheme for providing to a UE a resource for data transmission.
Figure 4:
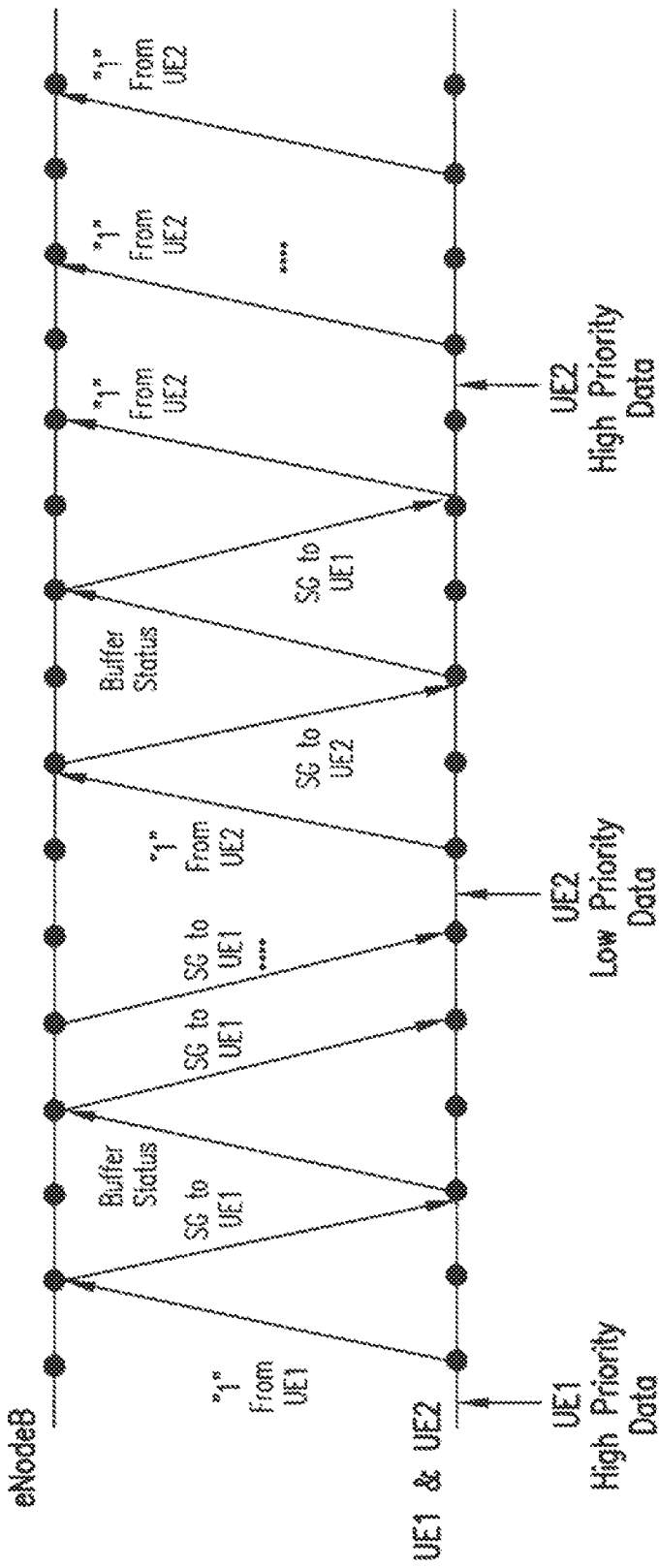
FIG. 4 illustrates an improved scheduling message flow between eNodeB and two UEs.

The example shown in FIG. 4 assumes there are two synchronized UEs (i.e., UE1 and UE2), neither of which initially has an uplink resource allocation for data transmission. It is further assumed that the UEs have a dedicated SR channel.

As shown in FIG. 4, when data arrives in the transmit buffer of UE1, UE1 provides to the scheduler notification of this event by transmitting an SR (e.g., a "1") to the scheduler using its next SR opportunity. In response, the scheduler grants UE1 some resources for data transmission and transmits an SG to the UE1. In response, the UE1 transmits a buffer status report to the eNodeB. The UE1 may also transmit data to the eNodeB, depending on the UL resources allocated to it.

As further shown in FIG. 4, when UE2 has data for transmission, UE2 transmits an SR (e.g., a "1") at its next SR opportunity. For the sake of this example, we shall assume that UE2's data has a lower priority than UE1's data. In response to receiving the SR transmitted by UE2, the scheduler, which at this point in time does not know that UE2's data has a lower priority than UE1's data, grants UE2 some resources blindly. UE2 uses the allocated resource to transmit a buffer status report containing QoS information and some data depending on the size of the allocation. Using the buffer status reports transmitted by UE1 and UE2, respectively, the scheduler compares UE 1's buffer status to UE2's buffer status and, based on the comparison, prioritizes the data from UE1 because the comparison indicates the low priority nature of UE2's data. Because the data from UE1 is prioritized, the scheduler does not schedule the UE2 further, thus preventing UE2 from transmitting its data. Consequently, because UE2 has data to send, UE2 will continue to transmit an SR in each of the TTI's in which it has an SR opportunity.

Relying on the data buffer report last transmitted from UE2, which reports indicated that the UE2 had only low priority data waiting for transmission, the scheduler ignores the SRs transmitted from UE2. The scheduler ignores these SRs even after the UE2 subsequently has high priority data to send because, other than through transmitting a buffer status report, there is no way for UE2 to notify the scheduler that it has higher priority data. Accordingly, in some cases, the scheduler may not be immediately aware of new high priority data arriving at UE2's transmit buffer.

This problem could be avoided if the scheduler were configured to grant some uplink resources to UE2 every once in a while, thereby providing the UE2 with opportunities to transmit to the scheduler a buffer status report indicating the new high priority data. However, if there are many users, this solution is quite costly in terms of resources. Another solution is to extend the SR from one bit to more than one bit so that the SR can contain information regarding data priority. However, this solution creates significant overhead for the SR channel, particularly if there are many priority levels. Embodiments of the present invention overcome the above described problem without the disadvantages suffered by these two solutions.

Embodiments of the present invention define an alternative SR triggering mechanism that is based on changes in transmit buffer status. With such an alternative triggering mechanism, the problems described above can be solved without increasing the SR from one bit to several bits and without periodically scheduling UEs to transmit buffer status reports.

According to embodiments of the present invention, the UEs are configured to transmit an SR only when certain predefined conditions are met, such as, for example, changes in the UE's transmit buffer content compared to what has been reported previously or what has been transmitted previously. For example, a predefined condition may be met whenever data arrives in the UE's transmit buffer and the data has a higher priority than the priority of the previously reported data (or transmitted data). The changes in buffer status that trigger a SR are typically configured through radio resource control (RRC) signaling.

In some embodiments, the UEs are configured to transmit an SR only when all of the following are true: (1) the UE has no uplink grant; (2) the UE has data to transmit to the eNodeB; and (3) the buffer status has "changed" since the last acknowledged buffer report was transmitted by the UE or the last acknowledged transmission was transmitted by the UE. In these embodiments, the scheduler is configured so that it will not ignore an SR from a UE configured as described above.

In some embodiments, the buffer status is considered to have "changed" only if one or more of the following conditions are met: (1) higher prioritized data has arrived in buffer; (2) the buffer size increase exceeds a predetermined threshold (Threshold A); or (3) the elapsed time since the transmission of the last SR exceeds a predetermined threshold (Threshold B). The thresholds A and B can typically be configured through RRC signaling. One exception to the above rule is that when data arrives to an empty buffer in the UE, the UE should always transmit an SR at the next SR opportunity.

In the above examples, when a UE receives a UL scheduling grant from the scheduler, the scheduler is subsequently made aware of the UE's buffer content through regular buffer status reports transmitted by the UE. This could be a continuous buffer report for each scheduled transmission. However, in some embodiments criterions are used for causing the UE to transmit buffer status reports. This means that if a UE is not granted further UL resources the latest acknowledged buffer report will be up-to date. It is also possible to use a variation of the above described SR triggering rules in case the UE does not send regular buffer reports.

For example, assuming the UE employs strict priority between radio bearers (i.e., data from higher prioritised radio bearers is always transmitted before data from lower prioritised radio bearers), then the scheduler will know that there is no higher priority data in the transmit buffer than what is being transmitted. In such a situation, the buffer status is considered to have "changed" only if one or more of the following conditions are met: (1) higher prioritized data has arrived in the buffer; or (2) the elapsed time since the last SR was transmitted exceeds a threshold (Threshold B). As before, one exception to the rule is that when data arrives to an empty buffer in the UE, the UE should always transmit an SR at its next SR opportunity. The threshold B is typically configured through RRC signaling.

Several alternatives and combinations of the examples above can be constructed. The present invention provides an improvement in that, instead of configuring the UE to transmit an SR whenever the UE has data to transmit, the UE is configured to transmit an SR only when it has data to transmit AND some other event has occurred (e.g., a certain amount of time has elapsed since the last SR was transmitted, the amount of data in the buffer grew by at least a certain amount since the most recent transmission of data or a status report, or the transmit buffer was empty just prior to it receiving the data).

In some embodiments, a triggered but not yet transmitted SR should be cancelled whenever the UE obtains a scheduling grant from the eNodeB before the SR transmission opportunity. In these cases, the UE will send high priority data first and optionally include a detailed buffer status report. In any case, the eNodeB is aware of the change even without obtaining a scheduling request.

Figure 5:
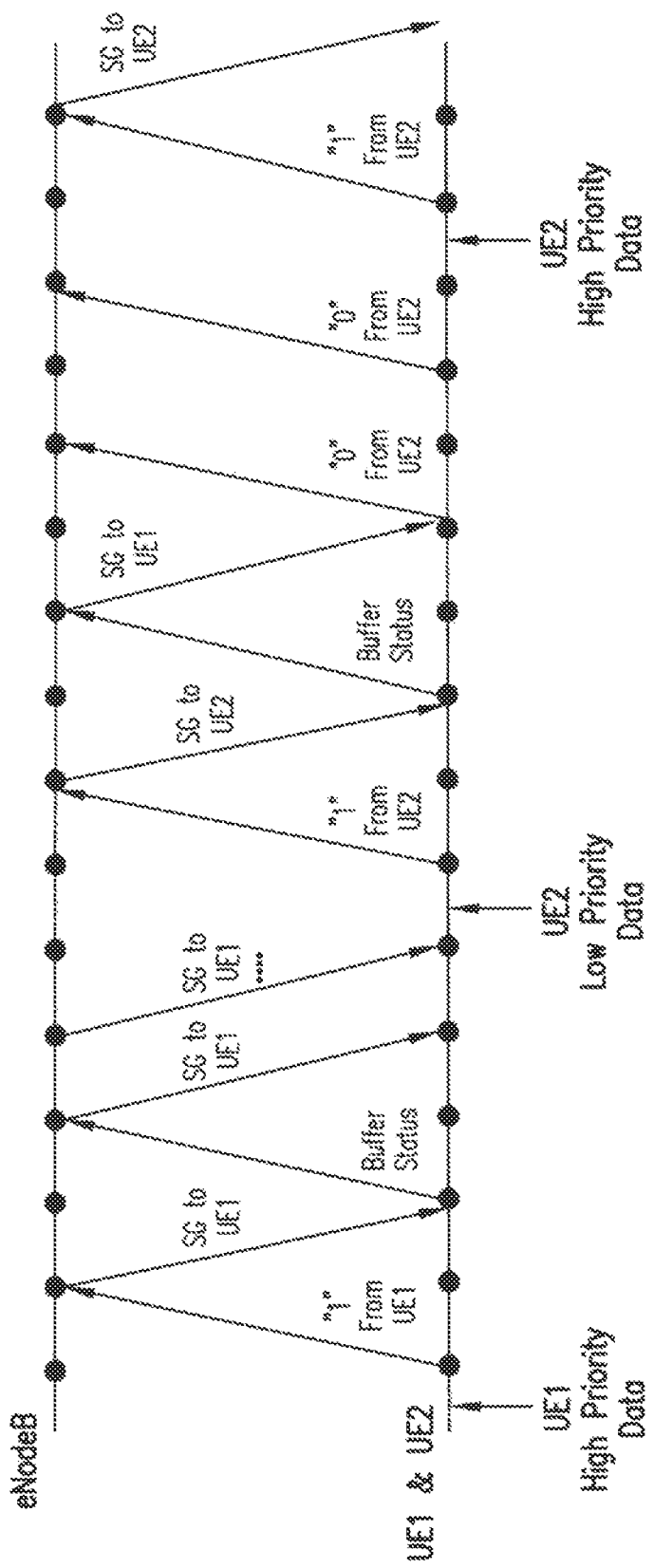
FIG. 5 illustrates a further improved scheduling message flow between an eNodeB and two UEs.

Referring now to FIG. 5, FIG. 5 illustrates a message flow in a system according to an embodiment of the invention, which system includes two UEs (UE1 and UE2). The illustrated message flow begins when UE1 receives high priority data in its transmit buffer. As shown in FIG. 5, in response to this event, UE1 transmits an SR to the eNodeB at its next SR opportunity.

In response, the eNodeB transmits an SG to UE1. In response to the SG, UE1 may transmit a buffer report that indicates the high priority of the data in UE1's transmit buffer. Some time after UE1 transmits the buffer report, UE2 may receive data in its transmit buffer, which event causes UE2 to transmit an SR at its next SR opportunity.

For the sake of this example, we shall assume that UE2's data has a lower priority than UE1's data. In response to receiving the SR transmitted by UE2, the eNodeB, which at this point in time does not know that UE2's data has a lower priority than UE1's data, grants UE2 some resources blindly. UE2 uses the allocated resource to transmit a buffer status report containing QoS information and some data depending on the size of the allocation. Based on the buffer status report, which indicates the low priority nature of UE2's data, the eNodeB prioritizes the data from UE1 and, thus, does not schedule the UE2 further, thereby preventing UE2 from transmitting its data (e.g., the eNodeB transmits to UE2 a Hybrid Automatic Repeat Request (HARQ) ACK for the transmission containing the buffer report and the UE2 stores the latest ACK'ed report).

However, rather than continue to transmit an SR at each subsequent SR opportunity, as is shown in FIG. 4, UE2 is configured so as to not transmit an SR until after one or more certain predefined events occur (e.g., the UE2 may transmit to the eNodeB the signal request bit with the bit set to the value of "0" instead of "1" until one of the events happen, as is shown in FIG. 5). Accordingly, UE2 is configured to check whether one or more certain events have occurred (such as the receipt of high priority data) prior to each subsequent SR opportunity so that, if one such event has occurred, the UE2 can transmit an SR at that next SR opportunity.

In this example, some time after UE2 transmitted the buffer status report, high priority data arrives in UE2's transmit buffer. The UE2 detects this event and, in response, transmits an SR (e.g., a "1") to the eNodeB. The UE2 may be configured to detect this event by comparing the last acknowledged buffer status report, which indicates the status of the transmit buffer at some previous point in time, to a newly generated buffer status information that indicates the current status of the transmit buffer. The eNodeB is configured to respond to the SR by granting an uplink resource to UE2, as opposed to ignoring the SR, even though the eNodeB has not received from UE2 a new buffer status report indicating that UE2 now has higher priority data. Accordingly, in this manner, embodiments of the present invention solve the problem discussed in connection with FIG. 4.

Figure 6A:
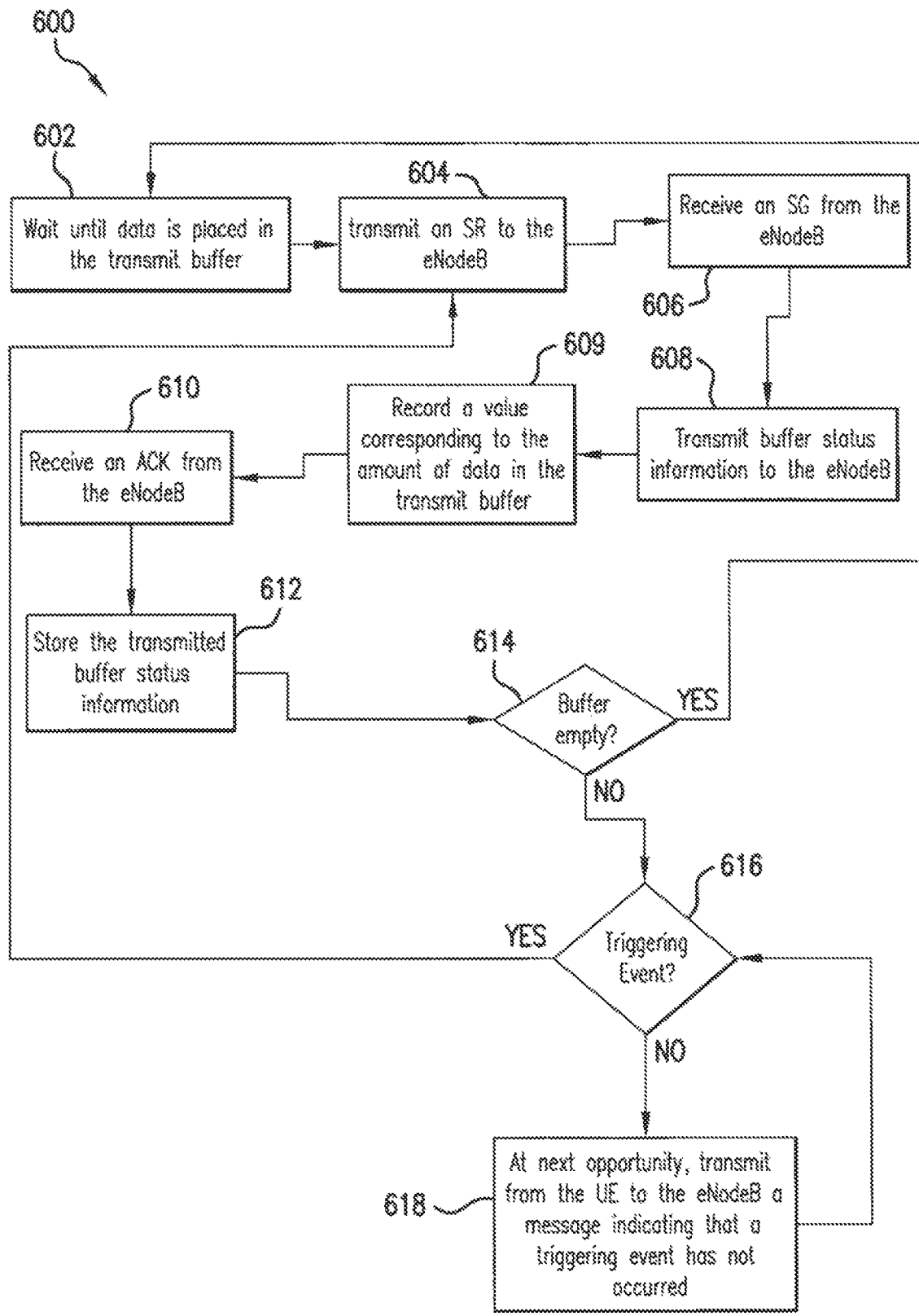
FIGS. 6a and 6b illustrate a process according to an embodiment of the invention.

Referring now to FIG. 6a, FIG. 6a is a flow chart illustrating a process 600, according to some embodiments of the invention, performed by a UE. Process 600 may begin in step 602. Process 600 assumes that the UE initially has no data to transmit to the eNodeB (e.g., the UE's transmit buffer is initially empty), accordingly, in step 602 the UE waits until data is placed in the transmit buffer. In response to the UE having data to send to the eNodeB, the UE transmits an SR to the eNodeB (step 604). In step 606, the UE receives an SG from the eNodeB. In step 608, the UE uses the resource allocated by the eNodeB to transmit to the eNodeB a buffer status report and/or some data depending on the allocated resource. In step 609, the UE may record a value representing the amount of data currently in its transmit buffer.

In step 610, the UE receives from the eNodeB a HARQ ACK for the transmission containing the buffer status report. In step 612, the UE stores the latest ACK'ed buffer status report (i.e., the report transmitted in step 608). In step 614, the UE determines whether it has data to send to the eNodeB (e.g., the UE determines whether its transmit buffer is empty). I fit does not have data to send (e.g., the buffer is empty), process 600 may proceed back to step 602, otherwise it may proceed to step 616.

In step 616, the UE determines whether an SR triggering event has occurred. If so, process 600 proceeds back to step 604, otherwise process 600 may proceed to step 618. In step 618, at the very next SR transmission opportunity, the UE transmits to the eNodeB a message indicating that a triggering event has not occurred (e.g., the UE transmits a one bit message to the eNodeB where the value of the bit is set to "0"). After step 618, process 600 may proceed back to step 616.

Figure 6B:
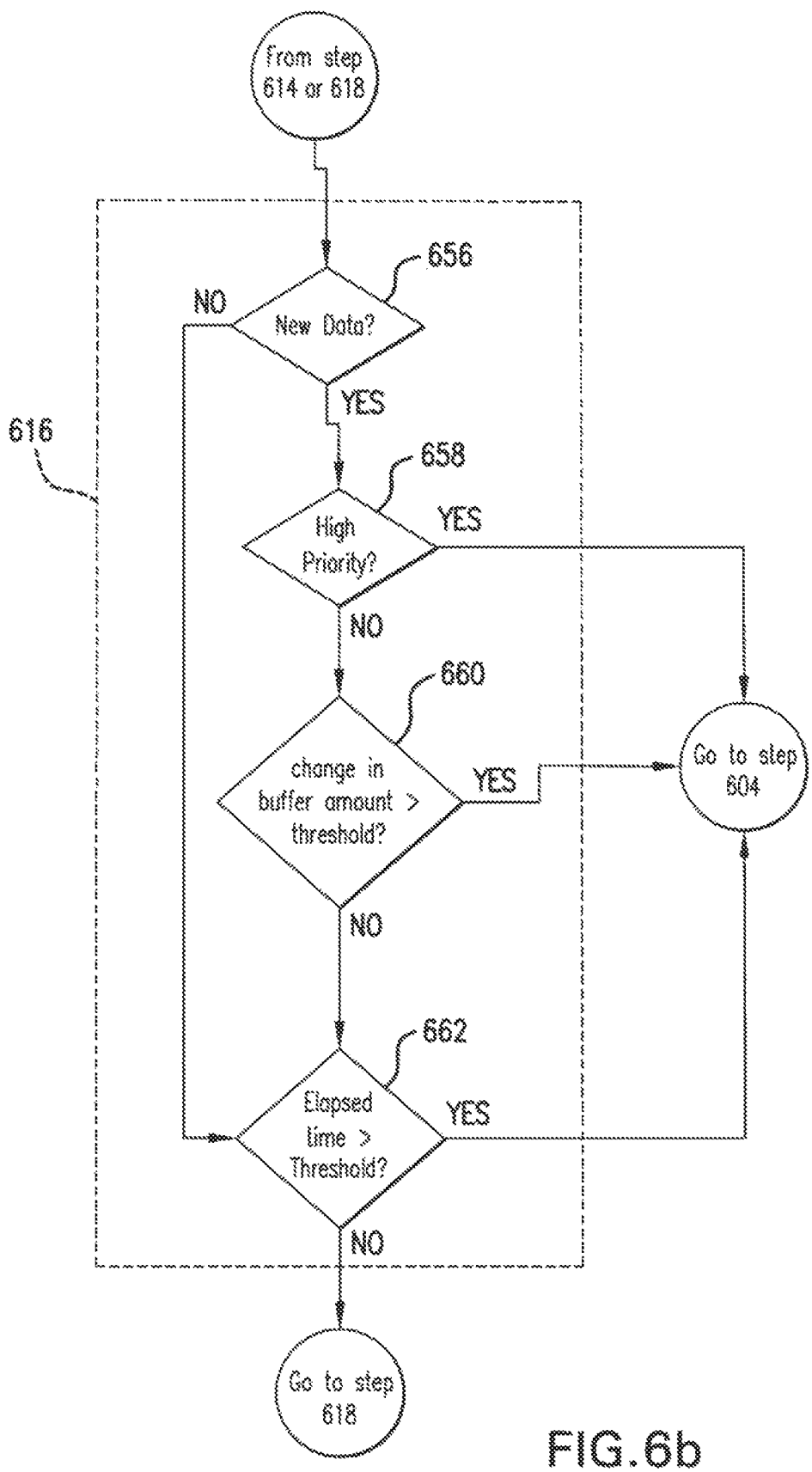

Referring now to FIG. 6b, FIG. 6b illustrates a process, according to some embodiments of the invention, for determining whether a triggering event has occurred. That is, FIG. 6b illustrates steps that may be performed in performing step 616 of process 600.

As shown in FIG. 6b, the process may begin in step 656, where the UE determines whether new data has arrived in the transmit buffer since a particular point in time. For example, the UE may determine whether new data has arrived in the transmit buffer since the last buffer status report was generated or since the last time the UE performed step 616. If the UE determines that new data has arrived, then the process may proceed to step 658, otherwise it may proceed to step 662.

In step 658, the UE determines whether the new data has a higher priority than the data that was in the transmit buffer when the new data arrived. The UE may determine this by comparing information in the buffer status report stored in step 612 to newly generated information reflecting the status of the current state of the transmit buffer. If the new data has a higher priority, then process may proceed to step 604 (i.e., the UE transmits an SR to the eNodeB), otherwise the process may proceed to step 660.

In step 660, the UE determines whether the difference between the amount of data currently in the transmit buffer and the amount of data that was in the transmit buffer at a previous point in time exceeds a threshold. For example, in step 660, the UE may find the difference between a value representing the amount of data currently in the transmit buffer and the value that was recorded in step 609 and compare the difference to the threshold value. If the difference equals or exceeds the threshold, then the process may proceed to step 604, otherwise the process may proceed to step 662.

In step 662, the UE determines whether the amount of time that has elapsed since the last SR was transmitted exceeds a threshold. If so, the process may proceed to step 604, otherwise the process may proceed to step 618.

We will now discuss error cases that may occur.

Error Case 1: In this first error case, either (a) the eNodeB misinterprets an SR (e.g., the eNodeB detects that the signal request bit is set to a "0" instead of a "1") and will not grant a resource or (b) the resource assignment message cannot be decoded by the UE. To handle this situation, the UE is configured to transmit an SR in all SR occasions until a UL grant is obtained (i.e., until the UE is given the opportunity to transmit data and/or a buffer status report).

Error Case 2: In the second error case, the eNodeB fails to decode the message containing the buffer status report or the initial data transmission. Waiting for the HARQ retransmission could cause excessive delay. The scheduler repeats the UL grant: (1) until a reliable report is obtained if buffer reports are transmitted with each UL transmission; (2) if buffer reports are triggering with similar criterions as for the SR (the UE will have a buffer change compared with the latest acknowledged report and continue to transmit reports until a reliable report is obtained); or (3) if no buffer reports are triggered new data is transmitted until the eNodeB is able to decode.

Error Case 3: In the third error case, the eNodeB detects the message containing the buffer report or the initial data transmission but the HARQ ACK is misinterpreted as a NACK by the UE. In this situation, the UE performs a regular HARQ retransmission, which fails as the eNodeB does not expect any further transmission attempts. The UE stops after the maximum number of transmission attempts. The UE does not need to perform another scheduling request if some subsequent transmission has succeeded. With the error handling in case 2, the eNodeB would have issued another grant if the transmission had failed.

Figure 7:
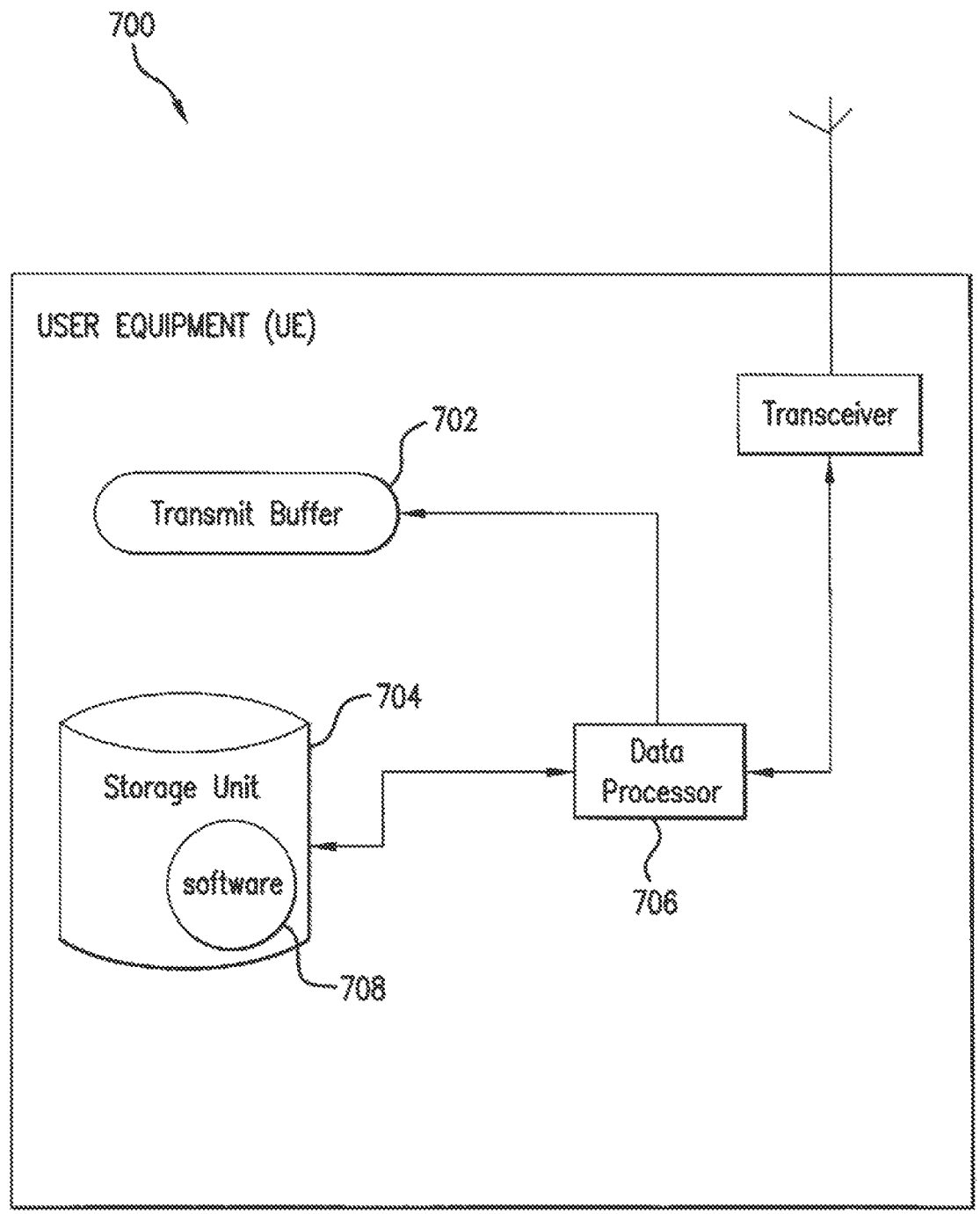
FIG. 7 is a functional block diagram illustrating some of the components of a mobile terminal.

Referring now to FIG. 7, FIG. 7 is functional block diagram of some components of a UE 700 according to an embodiment of the invention. As shown in FIG. 7, the UE may include: a transmit buffer 702 for buffering data to be transmitted to an eNodeB; a storage unit 704 for storing the last transmitted buffer status report; a data processor 706 for executing software 708 for determining whether an SR should or be transmitted (i.e., software 708 may be configured to performs, among other steps, steps 616-622 of process 600) and for causing an SR to be transmitted if it determines that an SR should be transmitted; a transmitter for wirelessly transmitting data to an eNodeB; and other elements.

Figure 8:
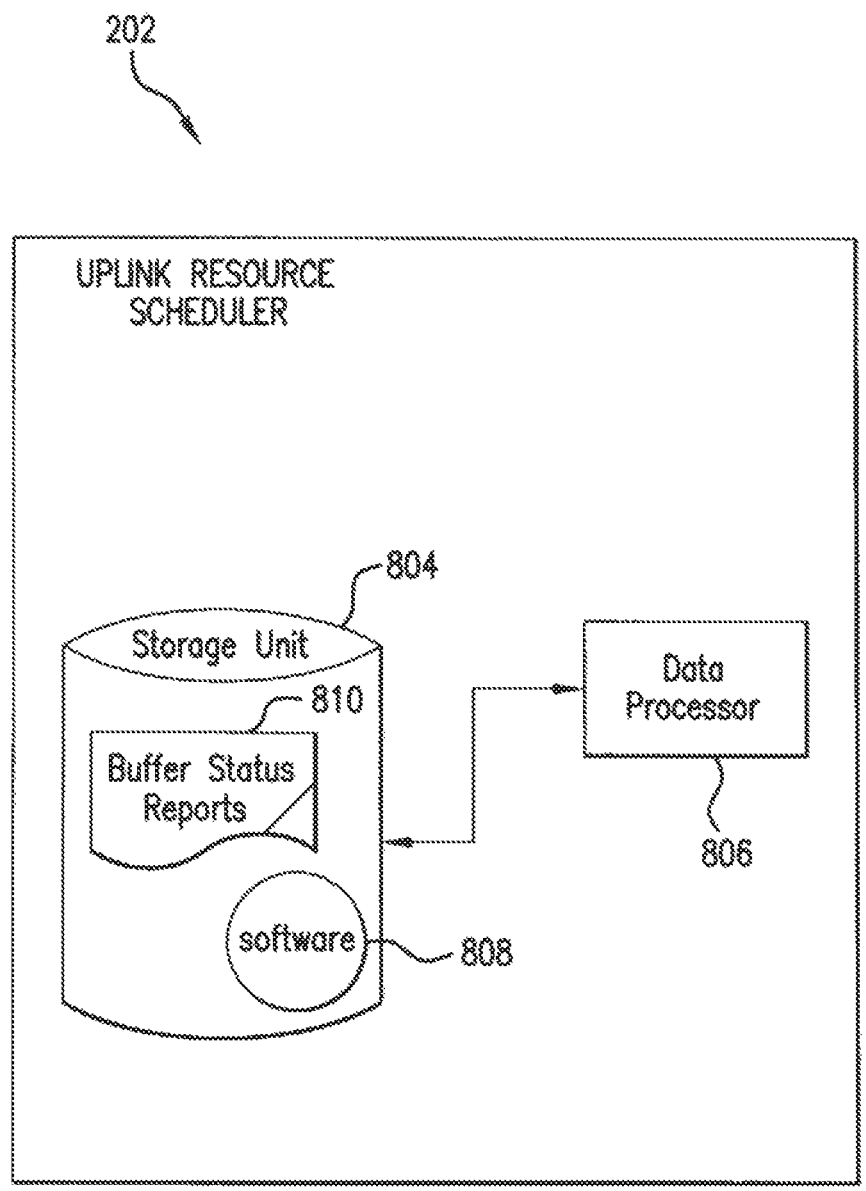
FIG. 8 is a functional block diagram illustrating some of the components of an uplink scheduler.

Referring now to FIG. 8, FIG. 8 is functional block diagram of uplink resource scheduler 202 according to an embodiment of the invention. As shown in FIG. 8, scheduler 202 includes: a storage unit 804 for storing buffer status reports 810; a data processor 806 for executing software 808. Software 808 is configured such that, when executed by data processor 806, software 808 causes the scheduler 202 to function as described above. That is, for example, software 808 may cause the scheduler 202 to schedule uplink resources based on a comparison of the buffer status of the UE's attempting to communicate with the eNodeB 240 and to respond to each SR. Although not shown, data processor 806 is coupled to a transmission means (e.g., transmit buffers and/or transmitters or the like) that enables the scheduler to communicate with UEs.

Figure 9:
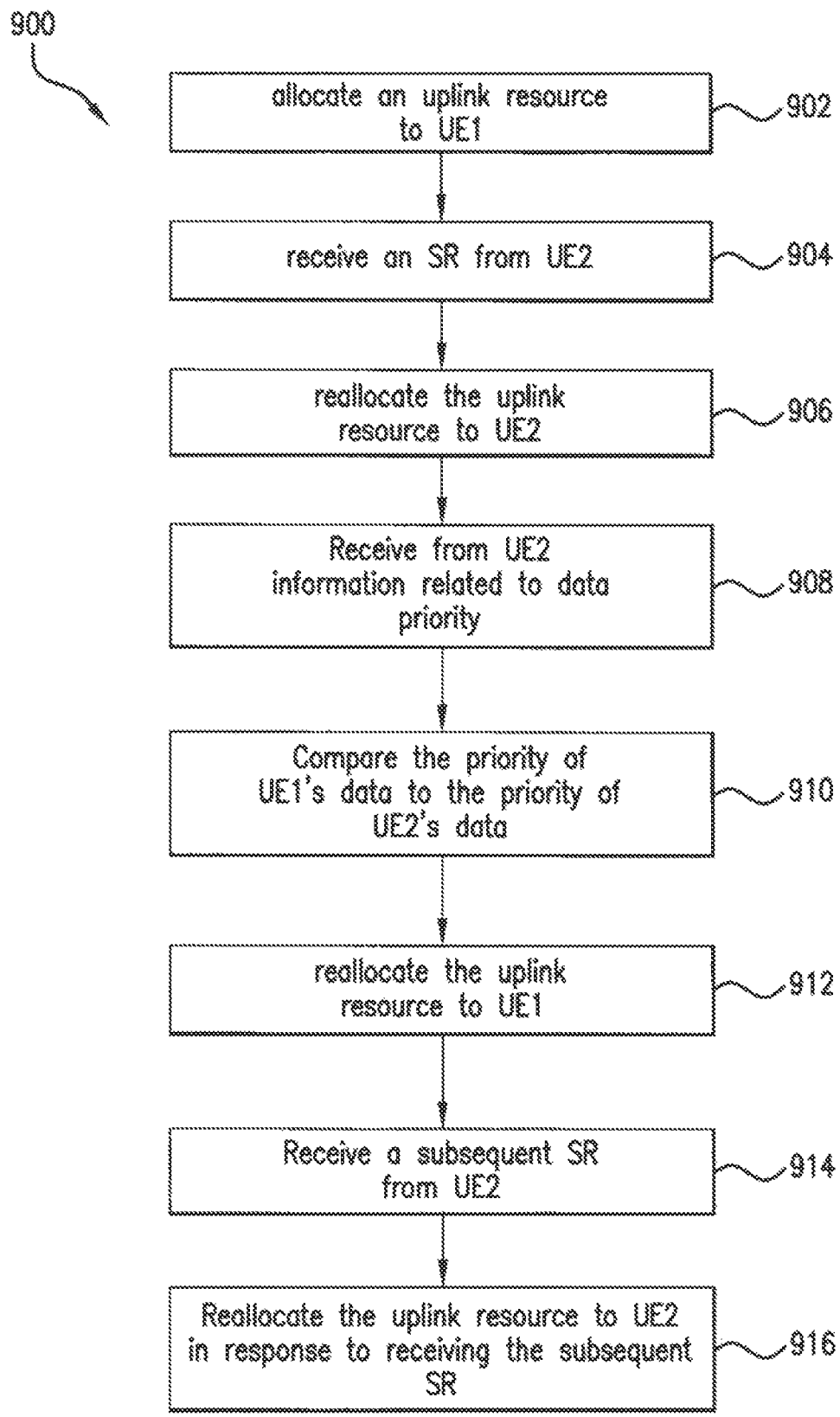
FIG. 9 is a flow chart illustrating a process according to an embodiment of the invention.

Referring now to FIG. 9, FIG. 9 is a flow chart illustrating a process 900 performed by a base station according configured according to an embodiment of the invention. As illustrated in FIG. 9, in step 902 the base station allocates an uplink resource to a first UE (UE1), thereby enabling UE1 to transmit data to the base station. In step 904, the base station receives an SR from a second UE (UE2) while UE1 is utilizing the uplink resource. In step 906, the base station reallocates the uplink resource to UE2 in response to receiving the SR. In step 908, the base station receives from UE2 information related to the priority of the data in UE2 that is waiting to be transmitted to the base station. In step 910, the base station compares the priority of UE1's data to the priority of UE2's data using the respective priority information. In step 912, the base station reallocates the uplink resource to UE1 in response to determining that UE1 has higher priority data than UE 1. In step 914, the base station receives a subsequent SR from UE2, wherein the subsequent SR is received after receiving the priority information from UE2 and before receiving any other data priority information from UE2. In step 916, the base station reallocates the uplink resource to UE2 in response to receiving the subsequent SR.

One advantage of embodiments of the invention is that the scheduler in the base station (eNodeB) is provided with selected updates of the terminal's buffer status and appropriate quality of service (QoS) knowledge even with a single bit SR, while decreasing the UE power consumption for the scheduling request channel (in case ON/OFF keying is used).

While various embodiments/variations of the present invention have been described above, it should be understood that they have been presented by way of example only, and not limitation. Thus, the breadth and scope of the present invention should not be limited by any of the above-described exemplary embodiments. Further, unless stated, none of the above embodiments are mutually exclusive.

Thus, the present invention may include any combinations and/or integrations of the features of the various embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A method for transmitting scheduling requests from a mobile terminal to a base station, the method comprising:
    sending a first scheduling request to the base station, wherein the first scheduling request is associated with first data to be transmitted to the base station;
    receiving a scheduling grant from the base station in response to the first scheduling request;
    transmitting a buffer status report to the base station in response to receiving the scheduling grant;
    receiving from the base station a Hybrid Automatic Repeat Request (HARQ) acknowledgment (ACK) for the buffer status report;
    receiving second data for transmission to the base station while at least some of the first data is waiting to be transmitted to the base station;
    detecting a change in a buffer status of the mobile terminal indicating that the second data has higher priority than the first data; and
    transmitting a second subsequent scheduling request to the base station in response to the change in buffer status.

2. The method according to claim 1, further comprising storing information for the buffer status report after receiving the HARQ ACK from the base station.

3. The method according to claim 2, further comprising comparing the stored information to new information about the status of a transmit buffer for the mobile terminal to detect a change in a status of the transmit buffer, and in response to a detected change in the status of the transmit buffer, determining whether data having a higher priority than the first data is currently stored in the transmit buffer.

4. The method according to claim 1, wherein the first scheduling request is a last scheduling request and the second subsequent scheduling request is transmitted at a next opportunity.

5. The method according to claim 1, wherein the change in the buffer status of the mobile terminal further comprises an amount of time that has elapsed since the first scheduling request was transmitted exceeds a threshold.

6. The method according to claim 1, wherein the change in the buffer status of the mobile terminal further comprises a difference between a current amount of data in a transmit buffer in the mobile terminal and a previous, non-zero amount of data that was in the transmit buffer exceeds a threshold.

7. The method according to claim 1, further comprising:
    responsive to an absence of the change in the buffer status, transmitting a message to the base station indicating that the buffer status has not changed, wherein the message is a one bit message.

8. The method according to claim 7, wherein the message is transmitted at a next opportunity.

9. The method according to claim 1, wherein the scheduling requests are sent on one of a scheduling request channel and a random access channel.

10. The method according to claim 1, further comprising:
    receiving uplink resources from the base station in response to the transmitting of the second subsequent scheduling request.

11. A mobile terminal, comprising:
    a buffer to store data to be transmitted to a base station; and
    a data processor in communication with the buffer, wherein the data processor is configured to:
    generate a first scheduling request for transmission to the base station, wherein the first scheduling request is associated with first data in the buffer to be transmitted to the base station;
    receive a scheduling grant in response to the first scheduling request;
    generate a buffer status report for transmission to the base station in response to receiving the scheduling grant;
    receive a Hybrid Automatic Repeat Request (HARQ) acknowledgment (ACK) for the buffer status report;
    receive second data in the buffer for transmission to the base station while at least some of the first data is waiting to be transmitted to the base station;
    detect a change in a buffer status of the mobile terminal indicating that the second data has higher priority than the first data; and
    generate a second subsequent scheduling request for transmission to the base station in response to the change in buffer status.

12. The mobile terminal of claim 11, further comprising storage to store information for the buffer status report after the mobile terminal receives the HARQ ACK from the base station.

13. The mobile terminal of claim 12, further comprising a transmit buffer,
    wherein the data processor is configured to compare the stored information to new information about the status of the transmit buffer for the mobile terminal to detect a change in a status of the transmit buffer, and
    wherein in response to a detected change in the status of the transmit buffer, the data processor is configured to determine whether data having a higher priority than the first data is currently stored in the transmit buffer.

14. The mobile terminal of claim 11, wherein the first scheduling request is a last scheduling request and the second subsequent scheduling request is transmitted at a next opportunity.

15. The mobile terminal of claim 11, wherein the change in the buffer status of the mobile terminal further comprises an amount of time that has elapsed since the first scheduling request was transmitted exceeds a threshold.

16. The mobile terminal of claim 11, wherein the change in the buffer status of the mobile terminal further comprises a difference between a current amount of data in a transmit buffer in the mobile terminal and a previous, non-zero amount of data that was in the transmit buffer exceeds a threshold.

17. The mobile terminal of claim 11, wherein the data processor is configured, in response to an absence of the change in the buffer status, to generate a message for transmission to the base station indicating that the buffer status has not changed, and wherein the message is a one bit message.

18. The mobile terminal of claim 17, wherein the message is transmitted at a next opportunity.

19. The mobile terminal of claim 11, wherein the data processor is configured to generate the scheduling requests for transmission on one of a scheduling request channel and a random access channel.

20. The mobile terminal of claim 11, wherein the data processor is configured to receive an uplink resource grant in response to transmission of the second subsequent scheduling request.

\* \* \* \* \*